(12) United States Patent
Shemtov

(10) Patent No.: US 8,586,877 B1
(45) Date of Patent: Nov. 19, 2013

(54) CAM LOCK MECHANISM FOR SECURING A CONDUIT COVER TO A CONDUIT BODY

(76) Inventor: Sami Shemtov, Hollywood, FL (US)

( * ) Notice: Subject to any disclaimer, the term of this patent is extended or adjusted under 35 U.S.C. 154(b) by 99 days.

(21) Appl. No.: 13/446,330

(22) Filed: Apr. 13, 2012

(51) Int. Cl.
*H02G 3/04* (2006.01)

(52) U.S. Cl.
USPC ........... 174/481; 174/96; 174/24; 174/480; 174/68.1; 439/207; 248/300; 52/220.01

(58) Field of Classification Search
USPC ............ 174/480, 481, 96, 68.1, 24; 439/207, 439/582; 248/300; 52/220.1; 220/3.8
See application file for complete search history.

(56) References Cited

U.S. PATENT DOCUMENTS

| | | | |
|---|---|---|---|
| 4,088,348 A | 5/1978 | Shemtov | |
| 4,159,134 A | 6/1979 | Shemtov | |
| 4,159,859 A | 7/1979 | Shemtov | |
| D287,396 S | 12/1986 | Shemtov | |
| 4,641,863 A | 2/1987 | Shemtov | |
| D376,415 S | 12/1996 | Shemtov | |
| 6,476,319 B1 | 11/2002 | Shemtov | |
| 6,808,181 B1 | 10/2004 | Shemtov | |
| 6,835,088 B2 | 12/2004 | Shemtov | |
| 6,939,160 B2 | 9/2005 | Shemtov | |
| 7,126,064 B1 | 10/2006 | Shemtov | |
| 7,476,817 B1 | 1/2009 | Shemtov | |
| 7,582,835 B2 * | 9/2009 | Pyron | 174/481 |
| 7,635,816 B1 | 12/2009 | Shemtov | |
| 7,893,363 B2 * | 2/2011 | Pyron | 174/481 |
| 8,129,631 B1 | 3/2012 | Shemtov | |
| 8,129,633 B1 | 3/2012 | Shemtov | |
| 2005/0194785 A1 | 9/2005 | Shemtov | |

* cited by examiner

*Primary Examiner* — Dhirubhai R Patel
(74) *Attorney, Agent, or Firm* — Craig A. Fieschko, Esq.; DeWitt, Ross & Stevens, S.C.

(57) ABSTRACT

A cam lock mechanism for securing a conduit cover to a conduit body includes a fastener extending from a cam lock. The fastener includes a fastener shaft situated between a fastener head and the cam lock. The fastener may include a flare portion, allowing the fastener to be secured to the cam lock by inserting the flare portion into a cam lock opening and deforming the flare portion. The cam lock may include an at least partially helical cam lock outer portion extending radially outwardly farther than the fastener shaft. When the cam lock mechanism is used to secure a conduit cover to a conduit body, the conduit cover is brought closer to the conduit body as the cam lock mechanism is rotated. A cam lock stopper, such as an upward bend, may be provided in the cam lock to resist overturning of the cam lock mechanism.

20 Claims, 5 Drawing Sheets

CAM LOCK MECHANISM FOR SECURING A CONDUIT COVER TO A CONDUIT BODY

FIELD OF THE INVENTION

This document concerns an invention relating generally to conduit assemblies, and more specifically to a cam lock mechanism for securing a conduit cover to a conduit body.

BACKGROUND OF THE INVENTION

A conduit system may include a set of tubes, pipes, or other conduits for electrical and mechanical wires and connectors. Conduit bodies may be used to house electrical or mechanical components at junctions of two or more sections, or at terminal points, of a conduit system. Containment of the components of conduit bodies (and thus of the conduit system) may be achieved in part using appropriate covers that are secured over conduit bodies of the conduit system. The preferably-removable covers are designed to protect the electrical and mechanical components from, for example, external forces and contamination by moisture and dust. Sample covers for conduit bodies are discussed in U.S. Pat. No. 8,129,631 to Shemtov.

The ability of a conduit cover to effectively enclose the interiors of conduit bodies, while providing for convenient access to the conduit bodies when needed, depends in large part on how the conduit cover is secured to the conduit body. Conduit covers are typically secured to conduit body using a screw fastener. However, such a method suffers from several drawbacks. Depending on the length of each screw, a user needs to screw each fastener into or out of a conduit body through many rotations, which can be very time intensive and tiring depending on the number of conduit covers being secured to and/or removed from conduit bodies. Additionally, the user does not readily know whether each screw has been sufficiently tightened. If a screw is under-turned, the conduit cover may not be adequately secured to the conduit body, leaving the components in the conduit body susceptible to contaminants (such as dust and moisture). If the screw is over-turned, the gasket forming a seal between the conduit cover and the conduit body may become deformed or damaged. Additionally, over-turning tends to strip the threads of the screw or conduit body, compromising the ability of the conduit body and conduit cover to be secured to each other.

What is needed is a mechanism that allows the user to conveniently secure a conduit cover to a conduit body more rapidly and without as much effort. Also, what is needed is a mechanism that allows the user to better know when optimal rotation of the fastener has been reached so as to avoid under- and over-turning of the fastener.

SUMMARY OF THE INVENTION

The invention involves a cam lock mechanism which is intended to at least partially solve the aforementioned problems. To give the reader a basic understanding of some of the advantageous features of the invention, following is a brief summary of preferred versions of the cam lock assembly, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

Referring initially to FIGS. 2-4, an exemplary cam lock mechanism 10 for securing a conduit cover 20 to a conduit body 30 (see FIG. 1) includes a fastener 40 (see FIG. 5A) extending from a cam lock 50 (see FIG. 5B). The fastener 40 is preferably secured to the cam lock 50 such that the cam lock 50 rotates as the fastener 40 rotates about a fastener long axis. The fastener 40 includes a fastener shaft 60 situated between a fastener head 70 and the cam lock 50. The cam lock 50 may include a cam lock inner portion 80 and a cam lock outer portion 90, with the cam lock outer portion 90 extending radially outwardly farther than the fastener shaft 60. When the cam lock mechanism 10 is securing a conduit cover 20 to a conduit body 30, the fastener head 70 and the cam lock 50 are situated on opposing sides of the conduit cover 20. The cam lock outer portion 90 is preferably at least partially helical, such that as the cam lock mechanism 10 is rotated, the conduit cover 20 is brought closer to the conduit body 30. The cam lock 50 also preferably includes a cam lock stopper 100, such as an upwardly protruding bend in the cam lock outer portion 90, to resist overturning of the cam lock mechanism 10.

Further advantages and features of the invention will be apparent from the remainder of this document in conjunction with the associated drawings.

DETAILED DESCRIPTION OF PREFERRED VERSIONS OF THE INVENTION

Figure 1:
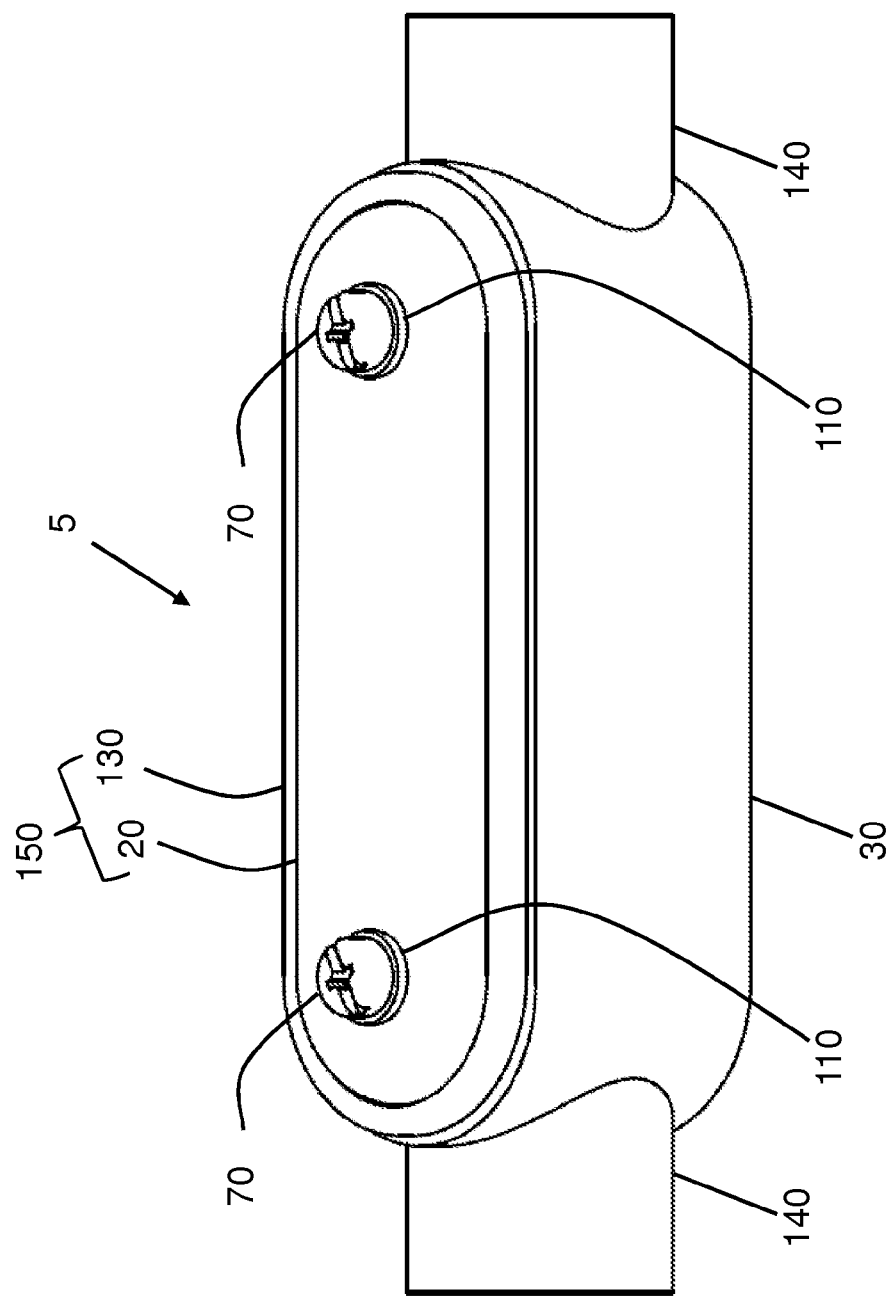
FIG. 1 is a side view of an exemplary conduit assembly 5 having a conduit cover 20 secured to a conduit body 30 using a cam lock mechanism 10.
Figure 2:
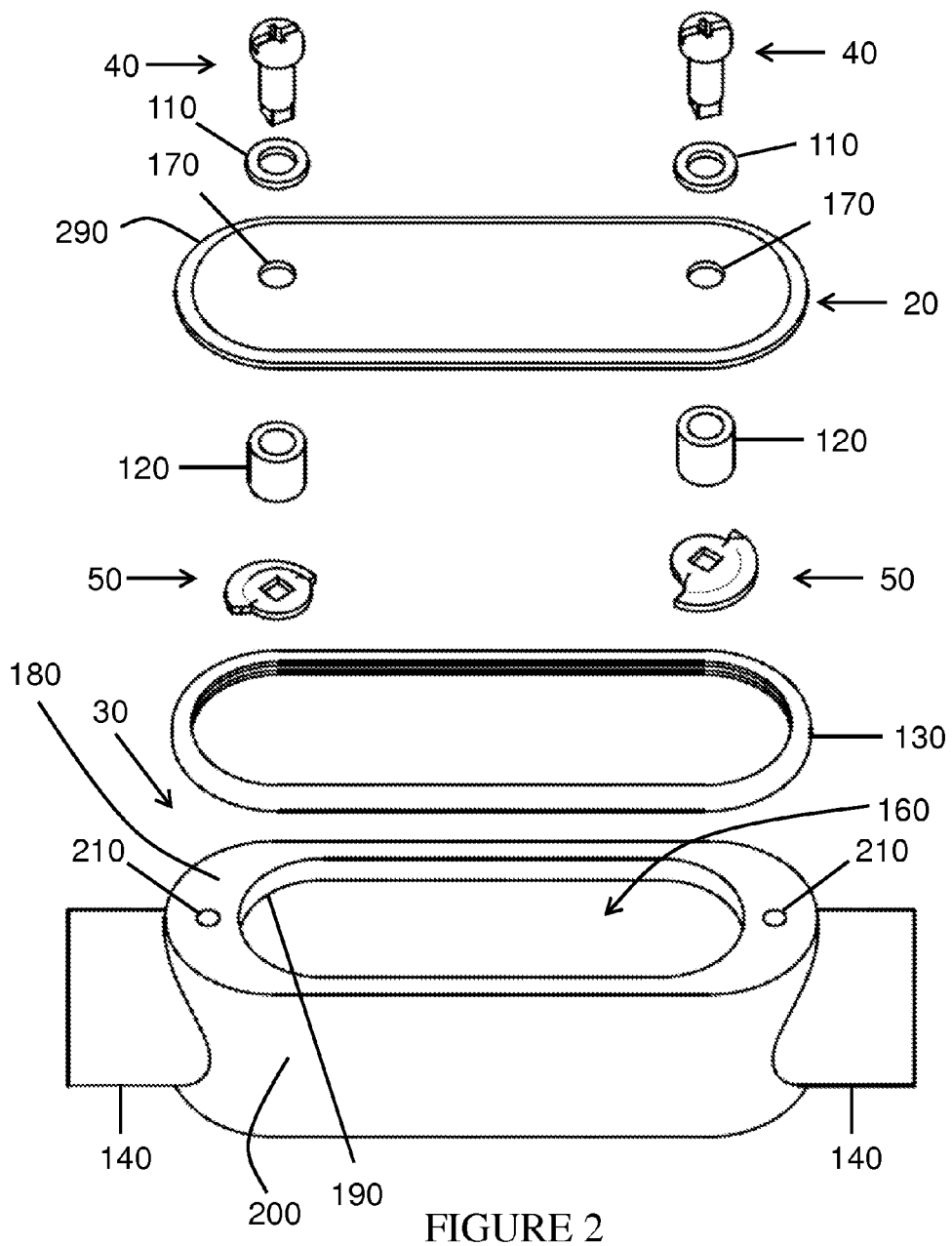
FIG. 2 is an exploded view of the conduit assembly 5 of FIG. 1, showing a fastener 40, a washer 110, the conduit cover 20, a bushing 120, a cam lock 50, a cover gasket 130, and the conduit body 30.

Turning initially to FIG. 1, an exemplary conduit assembly 5 includes two conduit connectors 140 extending from opposing ends of a conduit body 30. The conduit body 30 may provide housing for (for example) various electrical or mechanical components. Preferably, the conduit body 30 protects components housed therein from damage (resulting from, for example, impacts or punctures by foreign objects). The conduit connectors 140 may receive conduits (not pictured) able to serve as passageways for (for example) wiring or other components, the components passing through the conduits typically being able to interface with the components housed by the conduit body 30. The conduit body 30 is secured to a cover assembly 150, which includes a conduit cover 20 for enclosing a conduit body interior 160 (see FIGS. 2, 3). The cover assembly 150 preferably also includes a cover gasket 130 for enhancing a seal between the conduit cover 20 and the conduit body 30 to help protect components in the conduit body interior 160 from contaminants (such as moisture and dust). Depicted in FIG. 1 is the fastener head 70 (which may be a screw fastener head) of the cam lock mechanism 10 used to secure the cover assembly 150 to the conduit body 30. Situated between the fastener head 70 and the conduit cover 20 is a washer 110 for (for example) preventing moisture from entering the conduit body interior 160 through fastener apertures 170 (see FIG. 2) formed in the conduit cover 20.

Figure 3:
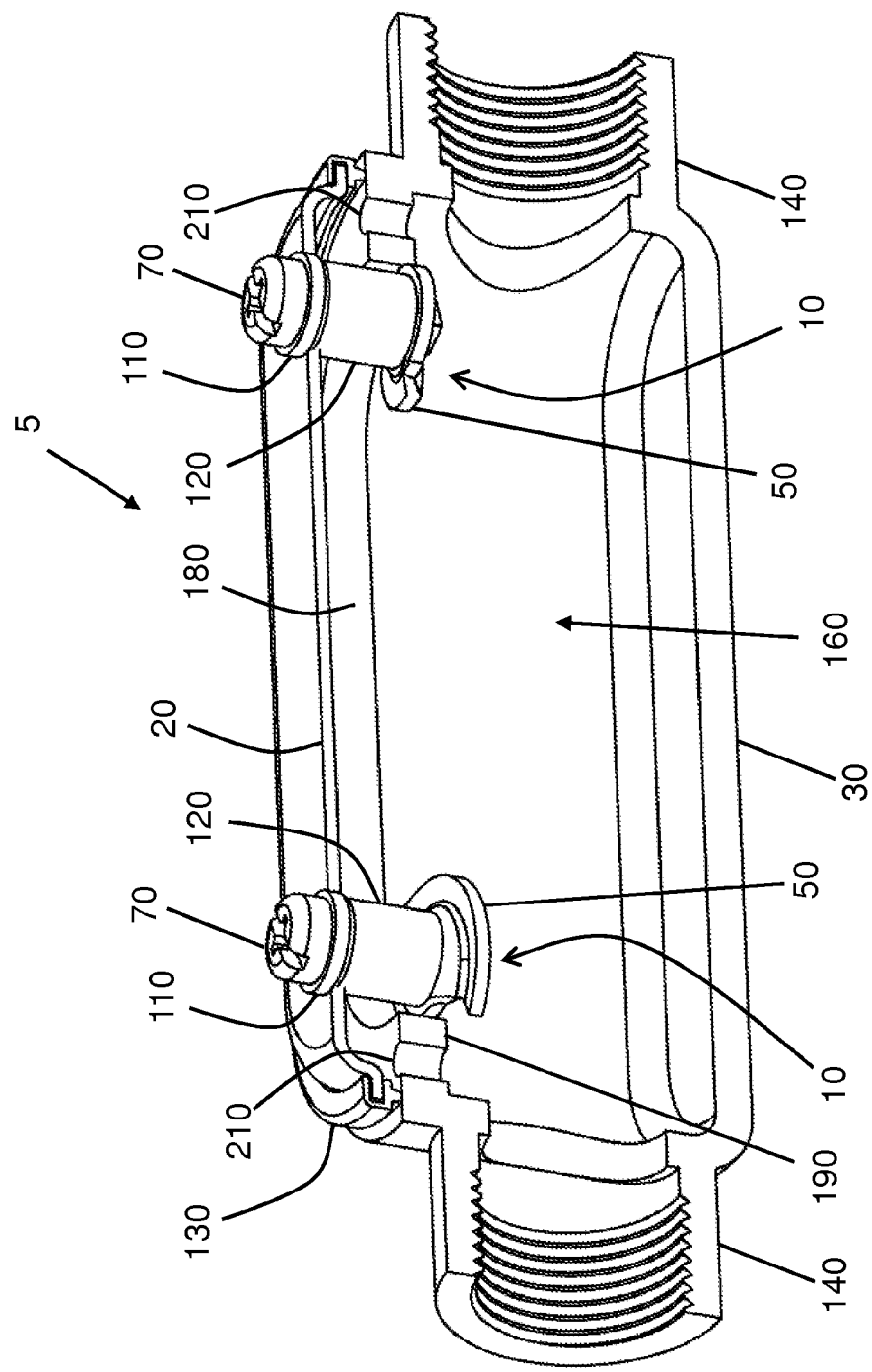
FIG. 3 is a cut-away side view of the conduit assembly 5 of FIG. 1.

Referring to FIG. 3, the conduit connectors 140 include threading for receiving (for example) threaded conduits. The conduit body 30 pictured (referred to as a "form 5" conduit body 30) includes a conduit body top 180 that forms a conduit body ledge 190. The conduit body ledge 190 is a portion of the conduit body top 180 that perpendicularly extends from the conduit body sidewalls 200 (see FIG. 2) to further enclose the conduit body interior 160. Formed into opposing ends of the conduit body ledge 190 of this type of conduit body 30 is a pair of mounting apertures 210 (see also FIG. 2). The cam lock 50 of the cam lock mechanism 10 is positioned at least partly within the conduit body interior 160, and the washer 110 and fastener head 70 are positioned above the conduit cover 20. Extending between the conduit cover 20 and the cam lock 50 is the bushing 120, which encircles and covers the fastener shaft 60 (see FIG. 5A). Preferably, the bushing 120 has a height such that the bushing 120 reduces wobbling of the cam lock mechanism 10 as the cam lock mechanism 10 is turned. That is, the bushing 120 is preferably elastic and "overlong" (pressing against both the conduit cover 20 and the cam lock 50) so that it creates tension between the conduit cover 20 and the cam lock mechanism 10. In this sense, the bushing 120 behaves as a spring. Advantageously, the bushing 120 also resists the entry of contaminants (such as dust and moisture) into the cam lock mechanism 10.

Figures 5A, 5B:
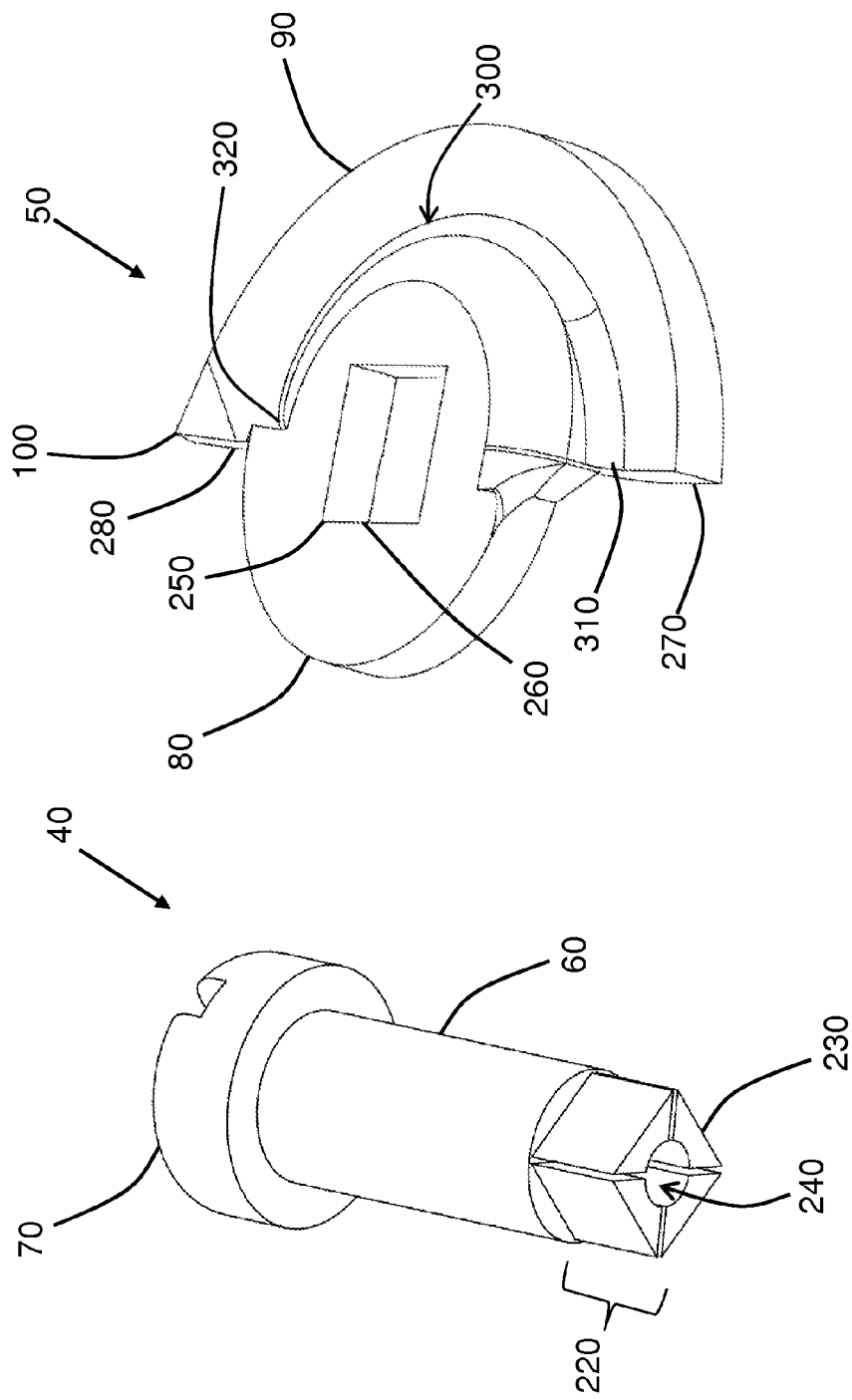
FIG. 5A is a perspective view of a fastener 40 of the exemplary cam lock mechanism 10 of FIGS. 1-4.
FIG. 5B is a perspective view of a cam lock 50 of the exemplary cam lock mechanism 10 of FIGS. 1-4.

Referring to FIG. 5A, the fastener 40 may include a flare portion 220 having a set of prongs 230 extending downwardly from the fastener shaft 60. The fastener head 70 and the flare portion 220 of the fastener 40 may be positioned at opposing ends of the fastener shaft 60. A flare portion opening 240 is formed between the prongs 230. The prongs 230 are deformable with respect to the fastener shaft 60 such that each prong may be bent outwardly farther away from other prongs 230. That is, each prong can be bent radially outwardly farther from a central long axis of the fastener 40. The prongs 230 may be flared apart using, for example, a punch tool. The punch tool may have (for example) an end having a tapered tip sized to partially fit into the flare portion opening 240 formed between the prongs 230. An opposing end of the punch tool may be flat, for example, to facilitate striking the punch tool using a blunt object (such as a hammer). To flare the prongs 230 apart, the tapered tip of the punch tool may be inserted into the flare portion opening 240, and with the fastener 40 secured (in vice grips, for example), the flat end of the punch tool may be stricken with a hammer to force the tapered tip into the flare portion 220 and consequently outwardly bend the prongs 230.

Figure 4:
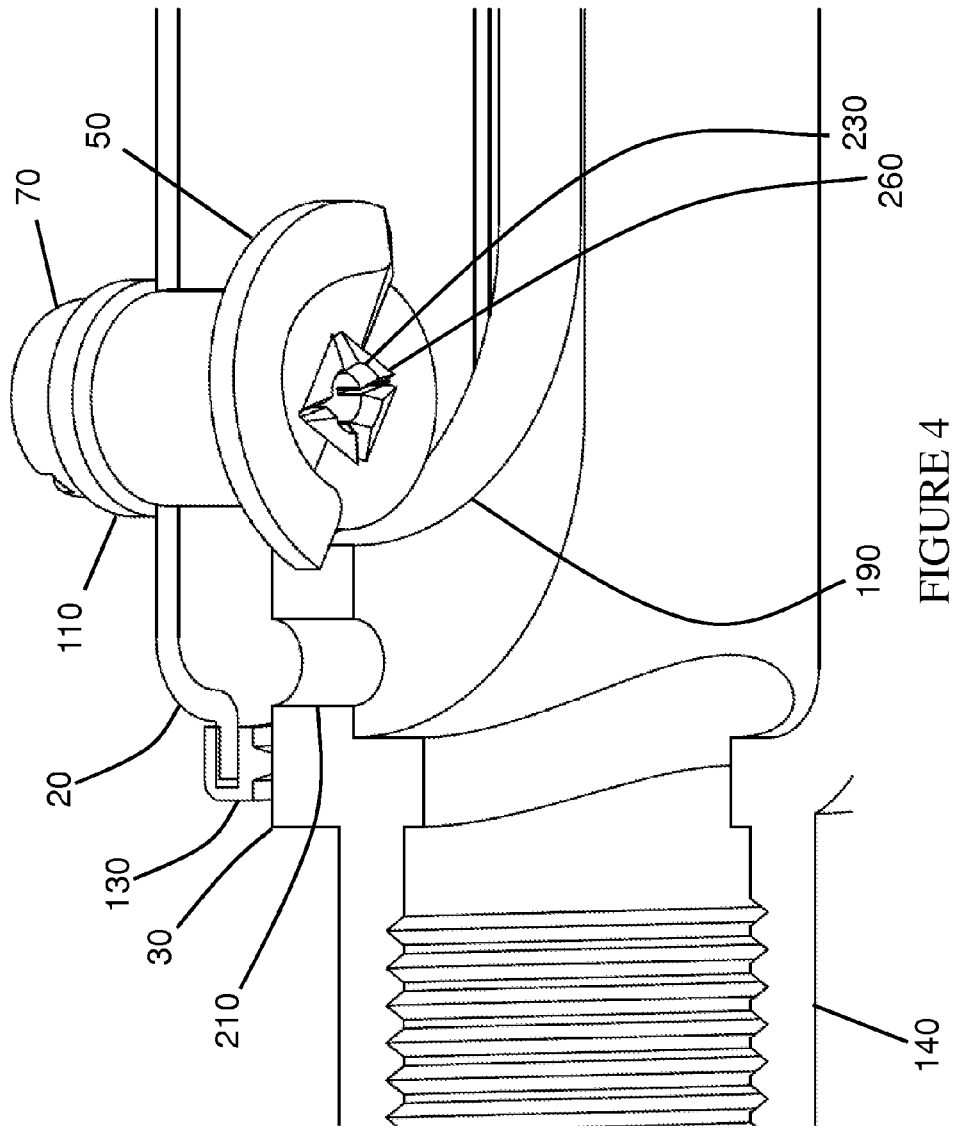
FIG. 4 is an alternative cut-away view of the conduit assembly 5 of FIG. 1 showing the cam lock mechanism 10 from below.

Referring to FIG. 5B, the cam lock 50 includes a cam lock opening 250 formed through the cam lock inner portion 80, the cam lock opening 250 having cam lock opening inner sidewalls 260. The cam lock opening 250 is sized to at least partly receive the flare portion 220 therein before the prongs 230 have been flared apart. The fastener 40 may be secured to the cam lock 50 by inserting the flare portion 220 of the fastener 40 into the cam lock opening 250 from above the cam lock 50. The prongs 230 may then be spread apart using a punch tool from below the cam lock 50. Once the flared prongs 230 have been bent outwardly to fit tightly within the cam lock opening 250, with the prongs 230 pressing against the cam lock opening inner sidewalls 260 (see FIG. 4), the fastener 40 resists being pulled apart from the cam lock 50. The cam lock opening 250 may have a rectangular shape (or other polygonal shape) with straight sides forming corners so as to enhance the ability of the fastener 40 and the cam lock 50 to fit together and rotate in lockstep.

The cam lock outer portion 90 helically extends from an outer portion first circumferential end 270 to an outer portion second circumferential end 280. The helical configuration of the cam lock outer portion 90 guides the conduit body ledge 190 along the cam lock outer portion 90 as the cam lock mechanism 10 is rotated. As the cam lock mechanism 10 is turned, the conduit body ledge 190 may enter a cam lock valley 300 at a valley first circumferential end 310, and the conduit body ledge 190 may follow a path towards a valley second circumferential end 320. The conduit cover 20 is pulled downwardly in the process, bringing the conduit cover 20 closer to the conduit body 30. However, if the conduit cover 20 is pressed against the conduit body 30 too forcefully, the gasket may be deformed or otherwise lose its ability to seal against contaminants. Moreover, if the cam lock mechanism 10 is overturned, the conduit body ledge 190 may "run off" past the valley second circumferential end 280, requiring a user to begin rotating the cam lock mechanism 10 to bring the conduit body ledge 190 back to the outer portion first circumferential end 270. The outer portion of the cam lock 50 thus preferably includes a cam lock stopper 100 configured to resist overturning of the cam lock mechanism 10. The cam lock stopper 100 may be a flange or bend in the cam lock outer portion 90 (such as near the outer portion second circumferential end 280) that, for example, protrudes upwardly from the cam lock outer portion 90. The cam lock mechanism 10 can be rotated to tighten the conduit cover 20 onto the conduit body 30 until, for example, the cam lock stopper 100 (flange, bend, etc.) engages or abuts the conduit body ledge 190. The cam lock mechanism 10 can be provided with a configuration that optimizes tightening when the cam lock stopper 100 is reached. This helps take guesswork out of the optimal tightening of the cam lock mechanism 10 and helps avoid rotation of the cam lock mechanism 10 past the outer portion second circumferential end 280.

Returning to FIG. 2, to assemble the cover assembly 150, a user may begin by fitting cover gasket 130 about a flat outer rim 290 of the conduit cover 20. The user may then insert the fastener 40 first through the washer 110, then through the cover fastener aperture 170, and then through the bushing 120. As discussed above, the user may then insert the flare portion 220 of the fastener 40 into the cam lock opening 250 and use a punch tool to secure the fastener 40 to the cam lock 50. The cover assembly 150 may then be placed over the top of the conduit body 30. The fastener shaft 60 has a height such that the cam lock 50 can at least partly enter the conduit body interior 160. To secure the cover assembly 150 to the conduit body 30, the cam lock mechanism 10 may be rotated using, for example, a screwdriver having a tip suitable for the fastener head 70. The user may stop rotating the cam lock mechanism 10 (and thus stop bringing the conduit cover 20 closer to the conduit body 30) when he or she experiences the cam lock stopper 100 engaging the conduit body 30. The exemplary cam lock mechanism 10 helps save time and effort, allowing the user to more conveniently and optimally secure the conduit cover 20 to the conduit body 30 with less than a single complete rotation (that is, by rotating the cam lock mechanism less than 360 degrees).

It should be understood that various terms referring to orientation and position are used throughout this document—for example, "top" (as in "conduit body top 180"), "above" (as in "positioned above the conduit cover 20"), and "below" (as in "a punch tool from below the cam lock 50")—are relative terms rather than absolute ones. In other words, it should be understood (for example) that the conduit body top 180 being referred to may in fact be located at the bottom of the conduit body 30 depending on the overall orientation of the conduit assembly 5. Thus, such terms should be regarded as words of convenience, rather than limiting terms.

Also in the following description, it is to be understood that such terms as "forward," "rearward," "left," "right," "upwardly," "downwardly," and the like are words of convenience and are not to be construed as limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, the fastener flare portion 220 need not have prongs but instead may (for example) be a one-piece structure with a cylindrical (or other-shaped) flare portion opening 240 formed therethrough. Such a fastener 40 having a one-piece flare portion 220 could be secured to a cam lock 50 by (for example) pressing down on and swaging the flare portion 220 using a swage tool and bench press. The fastener flare portion 220 may also be formed (for example) as any prism with three or more sides, with a flare portion opening 240 having any configuration desired. A cross section of such a flare portion 220 might have a triangular, rectangular, or other polygonal or curved shape, with a polygonal or curved flare portion opening 240 formed therein.

Second, rather than securing the cam lock 50 to the fastener 40 by punching, swaging, or otherwise deforming a flare portion 220, the two may be secured to each other in other ways. For example, the cam lock mechanism 10 may be premade as a one-piece mechanism, or the cam lock 50 may be soldered/welded to the fastener 40. Additionally, clips, adhesives, and other securing means may be utilized depending on the materials used to construct the cam lock mechanism 10 and its particular configuration.

Third, the cam lock mechanism 10 can be used with a variety of conduit bodies other than the "form 5" conduit body 30 depicted in the figures. Similarly, conduit covers 20 having other configurations and enclosing various portions of the conduit body 30 may be used. One, two, or more cam lock mechanisms 10 may adapted for securing many other components of conduit systems having different configurations.

Fourth, the cam lock stopper 100 need not be a bend in the cam lock outer portion 90. Instead, the cam lock stopper 100 can alternatively or additionally include (for example) a rough (non-smooth) portion intended to increase friction as the cam lock 50 approaches optimal tightness. The rough portion may increase in roughness as it extends toward the outer portion second circumferential end 280, requiring more force to rotate the cam lock mechanism 10 and indicating to the user that optimal tightness is being (or has already been) reached.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A cam lock mechanism for securing a conduit cover to a conduit body,
   a. the cam lock mechanism including:
      i. a fastener having a fastener shaft extending from a fastener head, the fastener shaft extending radially outwardly to a shaft radius; and
      ii. a cam lock having a cam lock outer portion and a cam lock inner portion, wherein the cam lock outer portion:
         1) helically extends from an outer portion first circumferential end to an outer portion second circumferential end; and
         2) has an outer portion radius that is greater than the shaft radius;
   b. wherein:
      i. the fastener shaft extends upwardly from the cam lock inner portion; and
      ii. the cam lock mechanism is configured to secure a conduit cover to a conduit body with the fastener head and the cam lock on opposing sides of the conduit cover.

2. The mechanism of claim 1 wherein the cam lock further includes a cam lock stopper, the cam lock stopper being configured to restrict the extent to which the cam lock may be turned when the cam lock mechanism is securing the cover to the conduit body.

3. The mechanism of claim 2 wherein the cam lock stopper is a flange protruding upwardly from the cam lock outer portion.

4. The mechanism of claim 1 further including a cam lock valley formed in the cam lock outer portion, the cam lock valley extending circumferentially at least partly about the cam lock.

5. The mechanism of claim 1 wherein the fastener is secured to the cam lock such that the cam lock rotates in lockstep with the fastener as the fastener rotates about a fastener long axis.

6. The mechanism of claim 1 wherein the cam lock inner portion includes a cam lock opening for receiving at least a portion of the fastener therein.

7. The mechanism of claim 6 wherein the cam lock opening has a substantially polygonal shape.

8. The mechanism of claim 6 wherein the fastener further includes a fastener flare portion, the fastener head and the fastener flare portion being situated at opposing ends of the fastener shaft.

9. The mechanism of claim 8 wherein:
   a. the fastener flare portion is at least partly inserted into the cam lock opening; and
   b. the fastener is securable to the cam lock by deforming the fastener flare portion against the cam lock when the fastener flare portion is at least partly situated in the cam lock opening.

10. The mechanism of claim 9 wherein:
    a. the fastener is configured to be securable to the cam lock by pressing on and swaging the fastener flare portion using a bench press and a swage tool; or
    b. the fastener flare portion includes at least two prongs, the fastener being configured to be securable to the cam lock by having the prongs outwardly bent against the cam lock using a punch tool.

11. The mechanism of claim 1 wherein the cam lock mechanism further includes a bushing positioned about the fastener shaft.

12. The mechanism of claim 1 in combination with the conduit cover having a fastener aperture formed therein, the fastener aperture sized to receive the fastener shaft therethrough.

13. The mechanism of claim 12 further in combination with the conduit body having a conduit body top opening onto a conduit body interior, wherein:
    a. the cam lock mechanism further includes a bushing positioned about the fastener shaft;

b. the conduit cover is:
   i. positioned over the conduit body top; and
   ii. secured to the conduit body using the cam lock mechanism;
c. the cam lock is positioned at least partly in the conduit body interior; and
d. the bushing extends from the conduit cover to the cam lock.

14. The mechanism of claim 13 wherein the bushing:
a. is elastic; and
b. has a bushing height that is greater than a distance between the conduit cover and the cam lock so as to:
   i. create tension between the conduit cover and the cam lock mechanism; and
   ii. reduce wobbling of the cam lock mechanism as the cam lock mechanism is rotated about a fastener long axis.

15. The mechanism of claim 12 further in combination with the conduit body having a conduit body ledge formed at a conduit body top, the conduit body top opening onto a conduit body interior.

16. The mechanism of claim 15 wherein the fastener shaft has a shaft height that is at least as large as a ledge thickness of the conduit body ledge.

17. The mechanism of claim 15 wherein:
a. the cam lock outer portion further includes:
   i. a cam lock valley; and
   ii. a cam lock stopper;
b. the conduit cover is positioned over the conduit body top to enclose the conduit body interior;
c. the cam lock mechanism is configured such that the cam lock valley at least partly receives a portion of the conduit body ledge therein as the cam lock mechanism is securing the conduit cover to the conduit body; and
d. the cam lock mechanism is configured to:
   i. pull the conduit cover towards the conduit body as the cam lock mechanism is rotated; and
   ii. resist being further rotated once the conduit body ledge engages the cam lock stopper.

18. A cam lock mechanism for securing a conduit cover to a conduit body, the cam lock mechanism including:
a. a cam lock having a cam lock outer portion and a cam lock inner portion with a cam lock opening formed therein; and
b. a fastener having a fastener head and a fastener flare portion at opposing ends of a fastener shaft, the fastener flare portion have two or more prongs that are outwardly bendable, wherein:
   i. the fastener is configured to be secured to the cam lock by:
      1) inserting the fastener flare portion at least partly within the cam lock opening; and
      2) deforming the prongs of the fastener flare portion against the cam lock using a punch tool; and
   ii. the cam lock mechanism is configured to secure a conduit cover to a conduit body with the fastener head and the cam lock on opposing sides of the conduit cover.

19. The mechanism of claim 18 wherein the cam lock further includes a cam lock outer portion having a cam lock stopper extending upwardly therefrom, the cam lock stopper being configured to resist overturning of the cam lock mechanism as the fastener is being rotated to secure the conduit cover to the conduit body.

20. A method of assembling a cam lock mechanism for securing a conduit cover to a conduit body,
a. the cam lock mechanism including:
   i. a cam lock having:
      1) a cam lock inner portion with a cam lock opening formed therein; and
      2) a helical cam lock outer portion; and
   ii. a fastener having a fastener head and a fastener flare portion on opposing ends of a fastener shaft, wherein
      1) the fastener shaft has a shaft radius that is less than an outer portion radius of the cam lock outer portion; and
      2) the fastener flare portion includes two or more prongs that are outwardly bendable using a punch tool;
b. the method including the steps of:
   i. the fastener to the cam lock by:
      1) the fastener flare portion at least partly within the cam lock opening; and
      2) deforming the fastener flare portion by using a punch tool to outwardly bend the prongs of the fastener flare portion against the cam lock; and
   ii. securing a conduit cover to a conduit body using the cam mechanism such that the fastener head and the cam lock are on opposing sides of the conduit cover.

* * * * *